United States Patent Office 3,141,027
Patented July 14, 1964

3,141,027
ALKANEDIOL BIS(2,3-EPOXYALKANOATES)
Benjamin Phillips and Paul S. Starcher, Charleston, and Donald L. MacPeek, South Charleston, W. Va., assignors to Union Carbide Corporation, a corporation of New York
No Drawing. Filed Mar. 12, 1959, Ser. No. 798,835
3 Claims. (Cl. 260—348)

This invention relates to the epoxidation of unsaturated organic compounds. In one aspect this invention relates to the epoxidation of an alpha,beta-olefinic ester of an alcohol free of aliphatic and cycloaliphatic unsaturation. In another aspect this invention relates to products resulting from the above-said epoxidation process.

This application is a continuation-in-part of application Serial No. 696,043, now abandoned, entitled "Epoxidation of Unsaturated Compounds," by B. Phillips, P. S. Starcher, D. L. MacPeek, filed November 13, 1957, and assigned to the same assignee as the instant application.

The syntheses of certain types of 2,3-epoxy esters are well known in the art. In 1892, Erlenmeyer produced ethyl β-phenyl-α,β-epoxypropionate by the interaction of benzaldehyde and ethyl chloroacetate in the presence of sodium. Between 1904 and 1932 Erlenmeyer's work was expanded by Darzens who generally favored the use of sodium ethoxide as the condensing agent. A modification by Darzens of his general procedure was the reaction of ketones or aldehydes with ethyl dichloroacetate and dilute magnesium amalgam, followed by hydrolysis of the product to produce β-hydroxy-α-chloroesters. Treatment with sodium ethoxide provided the glycidic esters. The disadvantages of the Darzens process include small yields, undesirable side reactions, wide boiling point range, e.g., 5° to 10° C., of many reported glycidic esters indicating the presence of impurities such as isomeric carbon or oxygen alkylation products, recommended use of an inert atmosphere, economic barriers presented by the high cost of starting materials, and others.

A similar reaction with methyl sorbate and perbenzoic acid in chloroform over a period of from about 5 to 10 days gave only methyl 4,5-epoxy-2-hexenoate and not the 2,3-epoxy or glycidic type of ester. Another method reported in the literature involved the reaction of methyl crotonate and perbenzoic acid to prepare methyl 2,3-epoxybutyrate. A yield of 44 percent was obtained by a procedure involving a reaction period of several months at 8° C. in the absence of light. A most recent work reported the expoxidation of acrylate, α-methacrylate, and crotonate esters by the use of the prohibitively expensive peroxytrifluoroacetic acid in a system buffered with disodium hydrogen phosphate. Almost universally a solvent such as methylene chloride or ethylene dichloride was required to minimize olefin polymerization.

The work of several investigators was summarized by Swern (Chem. Rev., 45, 50–51) in 1949 with respect to the epoxidation of alpha,beta-unsaturated esters with perbenzoic acid. His conclusions stated that the reaction of perbenzoic acid with an olefin bearing a carbonyl or carboalkoxy (—COOR) group in close proximity to the ethylenic bond was either slowed down to an exaggerated degree or prohibited by the presence of that group.

The present invention contemplates the preparation of a glycidic ester by the reaction of the corresponding alpha,beta-olefinic ester of an alcohol free of aliphatic and cycloaliphatic unsaturation with peracetic acid under epoxidation reaction conditions. By the term "alpha,beta-olefinic ester of an alcohol free of aliphatic and cycloaliphatic unsaturation," as used herein, is meant an olefinically unsaturated ester wherein the carboxylic acid residue(s) of said ester, i.e.,

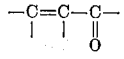

contains at least one double bond in the 2-position, wherein the alcohol residue(s) of said ester is free of aliphatic and cycloaliphatic unsaturation such as olefinic and acetylenic unsaturation, i.e., free of unsaturation other than aromatic unsaturation, and wherein the ester molecule is composed of carbon, hydrogen and oxygen atoms, said oxygen atoms being present in ester linkage(s)

or in ester linkage(s) and etheric linkage(s)

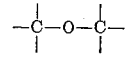

or in ester linkage(s) and hydroxyl linkage(s), —OH. The "alpha,beta-olefinic ester of an alcohol free of aliphatic and cycloaliphatic unsaturation" can be partially or substantially completely epoxidized depending upon the mol ratio of peracetic acid to said alpha,beta-olefinic ester employed, as will be described hereinafter in detail. The scope of the term "alpha,beta-olefinic ester of an alcohol free of aliphatic and cycloaliphatic unsaturation" is readily apparent from a consideration of the instant specification. For brevity, the term "alpha,beta-olefinic ester of an alcohol free of aliphatic and cycloaliphatic unsaturation" will be hereinafter referred to as "an alpha, beta-olefinic ester" or "an alpha,beta-unsaturated carbonylic compound" or "an alpha,beta-unsaturated ester."

Illustrative classes of alpha,beta-olefinic esters amenable as starting material in the epoxidation process include, among others, 2-alkenoate esters wherein the ether linkage is satisfied by a group such as alkyl, aryl, aralkyl, alkaryl or cycloalkyl; alkadienoate esters wherein one of the double bonds in the carboxylic acid residue is in the 2-position and wherein the ether linkage is satisfied by a group such as alkyl, aryl, alkaryl, aralkyl or cycloalkyl; cycloolefin-1-carboxylate esters wherein the ether linkage is satisfied by a group such as an alkyl, aryl, aralkyl, alkaryl, or cycloalkyl; alkylene glycol bis(2-alkenoates); poly(2-alkenoyloxy)alkanes; poly(2-alkenoyloxy)-cycloalkanes; poly(2-alkenoyloxy)benzenes; a,a-bis[mono- and poly(2-alkenoyloxy)cycloalkyl]alkanes wherein a designates the number of the carbon atom in the alkane moiety which is monovalently bonded to each cycloalkyl moiety; alpha,beta-olefinic esters of polyvinyl alcohol, polyallyl alcohol, etc.; mono-, bis-, tris-, and tetrakis(2-alkenoyloxy)-1,2-epoxycycloalkanes; mono-, and poly[2-alkenoyloxy(alkyleneoxy)$_n$]cycloalkanes wherein $n$ is a positive integer up to about 100; and the like.

In order to facilitate the understanding of the instant invention various exemplary classes of alpha,beta-olefinic esters employed as reagents in the epoxidation process will be depicted structurally. It is to be understood, however, that the generic invention is not to be lost sight of, that is, the preparation of a glycidic ester by the epoxidation of the corresponding alpha,beta-olefinic ester of an alcohol free from aliphatic and cycloaliphatic unsaturation (such as those esters encompassed in the various illustrated classes of the preceding paragraph and elsewhere in this specification), with peracetic acid, under epoxidation reaction conditions. The epoxidation reaction of the instant invention is, indeed, a significant advance in the art.

In one embodiment, the present invention contemplates the preparation of glycidic esters, i.e., alpha,beta-epoxy carbonylic compounds, having at least one group characterized as follows:

(I) 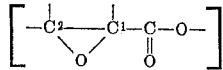

wherein the valence of the C¹ epoxy carbon is occupied by a hydrogen atom or a hydrocarbon group, such as alkylene, alkyl, cycloalkyl, aryl, alkaryl, and aralkyl radicals; wherein one valence of the $C^2$ epoxy carbon atom is occupied by a hydrogen atom or a hydrocarbon group such as alkylene, alkyl, cycloalkyl, aryl, alkaryl, or aralkyl radicals; wherein the remaining valence of the $C^2$ epoxy carbon atom being occupied by a hydrogen atom, a vicinal epoxyhydrocarbon group, e.g., vicinal epoxyalkyl, or a hydrocarbon group such as alkyl, cycloalkyl, alkylene, aryl, alkaryl, or aralkyl radicals; and wherein the ether valence is satisfied by a hydrocarbon group free of aliphatic and cycloaliphatic unsaturation, or an organic group composed solely of carbon, hydrogen and oxygen atoms, such as, for example, alkyl, cycloalkyl, aryl, alkaryl, aralkyl, epoxyalkyl, epoxycycloalkyl, acyloxyalkyl, i.e., alkanoyloxyalkyl, alkenoyloxalkyl, epoxyalkanoyloxyalkyl, and other radicals.

With reference to Formula I above, illustrative radicals which can be attached to the $C^1$ and $C^2$ epoxy carbon atoms include methyl, ethyl, propyl, butyl, isobutyl, hexyl, heptyl, 2-ethylhexyl, octyl, decyl, cyclohexyl, phenyl, benzyl, tolyl, phenethyl, epoxyethyl, epoxypropyl, epoxybutyl, and the like; and when the $C^1$ epoxy carbon valence and one of the $C^2$ epoxy carbon valences are alkylene radicals such as methylene or two or more continuously linked methylene radicals, the $C^1$ and $C^2$ epoxy carbon atoms form with the alkylene radicals a cycloaliphatic nucleus containing from 4 to 10 carbon atoms inclusive, preferably from 4 to 8 carbon atoms inclusive, such as cyclobutyl, cyclopentyl, cyclohexyl, cycloheptyl, cyclooctyl, etc., radicals. Representative radicals which are connected to the ether valence include, among others, methyl, propyl, butyl, hexyl, 2-ethylhexyl, heptyl, octyl, nonyl, cyclohexyl, phenyl, benzyl, phenethyl, tolyl, epoxyethyl, epoxypropyl, epoxybutyl, ethanoyloxyethyl, propanoyloxyethyl, propanoyloxypropyl, benzoyloxyethyl, propenoyloxybutyl, naphthoyloxypropyl, 2,3-epoxypropanoyloxyethyl, 2,3-epoxybutanoyloxybutyl, and the like.

The glycidic esters characterized by the Formula I above can be prepared by the reaction of peracetic acid and the corresponding α,β-unsaturated ester which has at least one group characterized as follows:

(II) 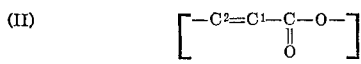

wherein the $C^1$ and $C^2$ epoxy carbon valences and the ether valence are occupied by the corresponding groups illustrated in structural Formula I supra. In addition, one valence of the $C^2$ epoxy carbon in Formula II supra can be attached to an alkenyl radical. Those α,β-unsaturated esters which have at least two groups characterized by Formula II above can undergo partial epoxidation or substantially complete epoxidation, i.e., the introduction of oxirane oxygen at the site of at least one of the alpha, beta-carbon to carbon ethylenic bond, depending upon the quantity of peracetic acid employed.

Accordingly, one or more of the following objects will be achieved by the practice of this invention.

It is an object of this invention to provide a novel process for the epoxidation of organic α,β-olefinic ester of an alcohol free of aliphatic and cycloaliphatic unsaturation with peracetic acid. It is a further object of this invention to prepare novel epoxide compounds resulting from the aforesaid epoxidation process. It is a still further object of this invention to provide a novel epoxidation process wherein complicating and undesirable side reactions are minimized. Other objects will become apparent to those skilled in the art in the light of the instant specification.

A detailed discussion regarding the exemplary α,β-unsaturated carbonylic compounds employed as starting material in the epoxidation reaction of this invention will aid to point out the diversities and ramifications which can be achieved in the instant invention.

In one embodiment of this invention the α,β-unsaturated carbonylic compound employed as starting material has the following general formula:

(III) 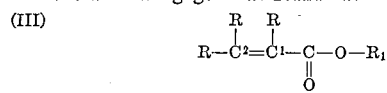

wherein each R, individually, can be a hydrogen atom or a hydrocarbon group such as alkyl, cycloalkyl, aryl, alkaryl, or an aralkyl radical; and wherein $R_1$ is a hydrocarbon group free of aliphatic and cycloaliphatic unsaturation such as alkyl, cycloalkyl, aryl, alkaryl, or an aralkyl radical. Exemplary radicals for R and $R_1$ include methyl, ethyl, propyl, butyl, pentyl, hexyl, 2-ethylhexyl, octyl, cyclohexyl, phenyl, benzyl, phenethyl, tolyl, and the like. Illustrative α,β-olefinic ester compounds employed as starting material include, among others, methyl acrylate, ethyl acrylate, butyl acrylate, methyl α-ethylacrylate, propyl α-butylacrylate, butyl α-ethyl-β-propylacrylate, ethyl crotonate, butyl α-ethylcrotonate, butyl crotonate, methyl α-ethyl-β-propylacrylate, 2-ethylhexyl α-methyl-β-ethylacrylate, 2-ethylhexyl crotonate, ethyl α-ethylcrotonate, ethyl β-methyl-β-ethylacrylate, ethyl β,β-dimethylacrylate, butyl α-phenylcrotonate, hexyl β-phenethyl-β-ethylacrylate, benzyl acrylate, pentyl β-phenyl-β-propylacrylate, tolyl crotonate, phenyl α-butylacrylate, and the like.

Illustrative 2,3-epoxy esters, i.e., glycidic esters, produced by the epoxidation of the corresponding α,β-unsaturated ester depicted in Formula III supra include, for example, methyl 2,3-epoxypropionate, ethyl 2,3-epoxypropionate, butyl 2,3-epoxypropionate, propyl 2-butyl-2,3-epoxypropionate, methyl 2-ethyl-2,3-epoxypropionate, ethyl 2,3-epoxybutyrate, propyl 2-ethyl-2,3-epoxybutyrate, 2-ethylhexyl 2-methyl-2,3-epoxyvalerate, 2-ethylhexyl 2,3-epoxypropionate, ethyl 3-methyl-2,3-epoxyvalerate, ethyl 3-methyl-2,3-epoxybutyrate, ethyl 3-phenyl-2,3-epoxypropionate, benzyl 2,3-epoxypropionate, pentyl 3-phenyl-2,3-epoxyhexanoate, butyl 3-phenethyl-2,3-epoxyvalerate, and the like.

In another embodiment of this invention the α,β-unsaturated ester, i.e., an alkadienoate ester wherein one double bond is present in the 2-position of the carboxylic acid residue, used as starting material is shown by the following formula:

(IV) 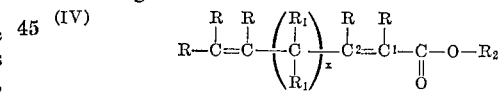

wherein each R, individually, can be a hydrogen atom or a hydrocarbon group such as alkyl, cycloalkyl, aryl, alkaryl, or an aralkyl radical; wherein $R_2$ is a hydrocarbon group free of aliphatic and cycloaliphatic unsaturation such as alkyl, aryl, alkaryl, cycloalkyl, or an aralkyl radical; wherein each $R_1$, individually, is a hydrogen atom or an alkyl radical such as methyl, ethyl, propyl, butyl, hexyl, and the like; and wherein $x$ is an integer from 0 to 12 inclusive, and preferably from 0 to 4 inclusive. Illustrative radicals for R and $R_2$ include methyl, ethyl, propyl, butyl, isobutyl, amyl, hexyl, 2-ethylhexyl, isohexyl, n-octyl, 3-methyloctyl, cyclohexyl, phenyl, benzyl, tolyl, phenethyl, phenylpropyl, and the like. Typical α,β-unsaturated esters which are epoxidized at both carbon to carbon double bond sites include methyl α,γ-pentadienoate, butyl α,γ-pentadienoate, ethyl α-methyl-α,γ-pentadienoate, butyl α,γ-diethyl-α,γ-pentadienoate, methyl α-phenyl-α,γ-hexadienoate, benzyl γ-propyl-α,γ-hexadienoate, tolyl β-phenethyl-γ-methyl-α,γ-heptadienoate, butyl 3-methyl-α-δ-heptadienoate, and the like.

Illustrative diepoxide esters resulting from the epoxidation of the alkadienoate esters depicted by Formula IV include methyl 2,3-4,5-diepoxyvalerate, butyl 2,3-4,5-diepoxyvalerate, ethyl 2-methyl-2,3-4,5-diepoxyvalerate, methyl 2-phenyl-2,3-4,5-diepoxyhexanoate, benzyl 4-propyl-2,3-4,5-diepoxyhexanoate, butyl 3-methyl-2,3-5,6-diepoxyheptanoate, tolyl 3-phenethyl-4-methyl-2,3-4,5-diepoxyheptanoate, and the like.

In a further embodiment of this invention the α,β-unsaturated ester, i.e., an alkyl, aryl, aralkyl, alkaryl, or cycloalkyl cycloolefin-1-carboxylate, employed as a reagent in the epoxidation reaction is depicted by the following formula:

(V) 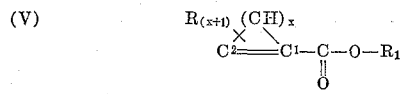

wherein each R is a hydrogen atom or a hydrocarbon group such as alkyl, aryl, alkaryl, or an aralkyl radical; wherein $R_1$ is a hydrocarbon group free of aliphatic and cycloaliphatic unsaturation, such as alkyl, aryl, alkaryl, cycloalkyl, aralkyl, or an epoxyalkyl radical; and wherein $x$ is an integer from 2 to 8 inclusive, and preferably from 2 to 6 inclusive. Illustrative compounds useful as starting material include methyl 1-cyclohexenecarboxylate, ethyl 1-cyclohexenecarboxylate, propyl 1-cyclohexenecarboxylate, butyl 1-cyclopentenecarboxylate, hexyl 1-cyclobutenecarboxylate, epoxypropyl 1-cyclohexenecarboxylate, phenethyl 1-cyclopentenecarboxylate, tolyl 2-methyl-1-cycloheptenecarboxylate, benzyl 2-ethyl-1-cyclohexenecarboxylate, phenyl 1-cyclopentenecarboxylate, butyl 2-phenyl-1-cyclohexenecarboxylate, amyl 3-phenethyl-1-cyclohexenecarboxylate, alkyl lower alkyl-substituted-1-cyclohexenecarboxylates, alkyl aryl-substituted-1-cyclohexenecarboxylates, and the like.

The epoxidation of the unsaturated cycloaliphatic ester characterized by Formula V above results in the formation of an epoxy group at the site of the carbon to carbon double bond, thus forming the corresponding oxabicyclo compounds. Illustrative oxabicyclo compounds which can be produced by the practice of this invention include methyl 7-oxabicyclo[4.1.0]-heptane-1-carboxylate, ethyl 7-oxabicyclo[4.1.0]heptane-1-carboxylate, butyl 7-oxabicyclo[4.1.0]heptane-1-carboxylate, ethyl 8 - oxabicyclo [5.1.0]octane-1-carboxylate, propyl 6-oxabicyclo[3.1.0] hexane-1-carboxylate, ethyl 6-oxabicyclo[3.1.0]hexane-1-carboxylate, propyl 5 - oxabicyclo[2.1.0]pentane-1-carboxylate, butyl 2-methyl-7-oxabicyclo[4.1.0]heptane-1-carboxylate, alkyl lower alkyl-substituted-7-oxabicyclo [4.1.0]heptane - 1 - carboxylate, alkyl aryl-substituted-7-oxabicyclo[4.1.0]heptane-1-carboxylate, butyl 2-phenyl-7-oxabicyclo[4.1.0]heptane - 1 - carboxylate, n-hexyl 2-ethyl-6-oxabicyclo[3.1.0]hexane-1-carboxylate, phenethyl 5-oxabicyclo[2.1.0]pentane-1-carboxylate, phenyl 6-oxabicyclo[3.1.0]hexane-1-carboxylate, tolyl 7-oxabicyclo [4.1.0]heptane-1-carboxylate, and the like.

In a still further embodiment of this invention the α,β-unsaturated ester, i.e., alkylene glycol bis(2-alkenoate), employed as starting material has the following structural formula:

(VI) 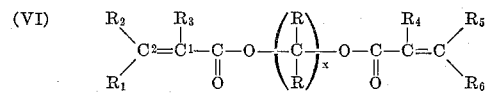

wherein each $R_1$ through $R_6$, individually, is a hydrogen atom or a hydrocarbon group such as alkyl, aryl, alkaryl, cycloalkyl, or an aralkyl radical; wherein each R, individually, is a hydrogen atom or an alkyl radical, preferably a lower alkyl radical, e.g., methyl, ethyl, propyl, butyl, amyl, hexyl, and the like; and wherein $x$ is an integer from 2 to 10 inclusive. Illustrative $R_1$ to $R_6$ radicals include methyl, ethyl, propyl, butyl, isobutyl, pentyl, n-hexyl, isohexyl, 2-ethylhexyl, octyl, 2-ethyloctyl, phenyl, benzyl, phenethyl, phenylpropyl, tolyl, and the like.

According to the quantity of peracetic acid employed, the α,β-unsaturated ester shown in Formula VI, i.e., an alkylene glycol bis(2-alkenoate), can undergo monoepoxidation or diepoxidation. When employing substantially equimolar or less than equimolar ratios of peracetic acid to α,β-unsaturated ester, the reaction provides substantially the monoepoxide. By employing an excess of peracetic acid, e.g., more than two mols of peracetic acid per mol of unsaturated ester, diepoxides result from the reaction.

Among the monoepoxide compounds, i.e., alkylene glycol 2-alkenoate 2,3-epoxyalkanoates, which can be formed from the corresponding alkylene glycol bis(2-alkenoates) include, for example, ethylene glycol acrylate 2,3-epoxypropionate, propylene glycol acrylate 2,3-epoxypropionate, ethylene glycol crotonate 2,3-epoxybutyrate, propylene glycol crotonate 2,3-epoxybutyrate, ethylene glycol methacrylate 2-methyl-2,3-epoxypropionate, 1,5-pentanediol crotonate 2,3-epoxybutyrate, 3-methyl-1,5-pentanediol crotonate 2,3-epoxybutyrate, 1,3-butylene glycol crotonate 2,3-epoxybutyrate, and the like. Illustrative diepoxides, i.e., alkylene glycol bis(2,3-epoxyalkanoates), include ethylene glycol bis(2,3-epoxypropionate), propylene glycol bis(2,3-epoxypropionate), ethylene glycol bis(2,3-epoxybutyrate), propylene glycol bis(2,3-epoxybutyrate), ethylene glycol bis-(2,3-epoxyvalerate), propylene glycol bis(2-methyl-2,3-epoxypropionate), 1,3-butylene glycol bis (2,3-epoxybutyrate), 1,5-pentanediol bis(2,3-epoxybutyrate), 3-methyl-1,5-pentanediol bis(2,3-epoxybutyrate), 1,9-nonanediol bis(2-ethyl-2,3-epoxyhexanoate), and the like.

Another embodiment of this invention is directed to the use of poly(2-alkenoyloxy)alkanes as starting material in the instant epoxidation process. The poly(2-alkenoyloxy)alkanes contemplated as reagents are those in which no more than 2-alkenoyloxy moiety is monovalently bonded to any one carbon atom constituting the alkane chain. Illustrative poly(2-alkenoyloxy)alkane reagents include, for example, 1,2,3-tris(2-butenoyloxy)propane, 1,3-bis-(propenoyloxy)butane, 1,2,3,4-tetrakis(2-butenoyloxy)butane, 1,2,3-tris(2-pentenoyloxy)-butane, 1,4-bis(propenoyloxy)pentane, 1,5-bis(2-hexenoyloxy)heptane, 1,3,5-tris(2-ethyl-2-hexenoyloxy)hexane, and the like.

The poly(2-alkenoyloxy)alkanes can undergo partial epoxidation or substantially complete epoxidation, i.e., the introduction of oxirane oxygen at the site of at least one of the alpha,beta-carbon to carbon ethylenic bond, depending upon the quantity of peracetic acid employed. Thus, when employing substantially equimolar or less than equimolar ratios of peracetic acid to poly(2-alkenoyloxy) alkane, the reaction provides substantially the monoepoxide. Substantially complete epoxidation of the poly(2-alkenoyloxy)alkane occurs when equivalent amounts of peracetic acid to poly (2-alkenoyloxy)alkane are employed. Expressed differently, essentially complete epoxidation of the poly(2-alkenoyloxy)alkane can be effected when the number of mols of peracetic acid employed is substantially equal to or is greater than the number of mols of 2-alkenoyloxy moieties contained in the poly(2-alkenoyloxy)alkane reagent. For instance, when employing a substantially equimolar ratio of peracetic acid to 1,2,3-tris(propenoyloxy)propane, the reaction provides substantially the monoepoxide. However, at least three, or more, mols of peracetic acid per mol of 1,2,3-tris(propenoyloxy)alkane are necessary to give substantially the triepoxide, namely 1,2,3-tris(2-3-epoxypropanoyloxy)propane. Of course, a mixture of mono- and poly- epoxide products will result by employing greater than an equimolar ratio and less than an equivalent ratio of peracetic acid to polyester (which in this illustration is 1,2,3-tris-(propenoyloxy)propane). Techniques such as fractional distillation, crystallization, etc., can be employed to resolve the epoxide product mixture. Illustrative poly(2,3-epoxyalkanoyloxy)alkanes which result from the epoxidation of the corresponding poly(2-alkenoyloxy)alkanes include, among others, 1,2,3-tris(2,3-epoxybutanoyloxy)propane, 1,3-bis(2,3-epoxybutanoyloxy)butane, 1,2,3,4-tetrakis(2,3-epoxybutanoyloxy)butane, 1,2,3-tris(2,3-epoxypentanoyloxy)butane, 1,4-bis(2,3-epoxypropanoyloxy)pentane, 1,5-bis(2,3-epoxyhexanoyloxy)heptane, 1,3,5-tris(2,3-epoxy-2-ethylhexanoyloxy)hexane, and the like.

The poly(2-alkenoyloxy)cycloalkanes wherein no more than one 2-alkenoyloxy moiety is monovalently bonded to any one carbon atom constituting the cycloalkane nucleus represent another illustrative class of α,β-olefinic esters which can be employed as reagents in the novel epoxidation process. Exemplary poly(2-alkenoyloxy)cycloalkanes include, for example, 1,2-bis(propenoyloxy)cyclohexane, 1,2,4-tris(propenoyloxy)cyclohexane, 1,2,4,5-tetrakis(2-butenoyloxy)cyclohexane, 1,3-bis(2-ethyl-2-hexenoyloxy)cyclopentane, 1,2,4,5-tetrakis(2-pentenoyloxy)cycloheptane, 1,4-bis(2-heptenoyloxy)cycloheptane, and the like. Among the poly(2,3-epoxyalkanoyloxy)cycloalkanes which can be formed by the epoxidation of the corresponding poly(2-alkenoyloxy)cycloalkanes include, for instance, 1,2-bis(2,3-epoxypropanoyloxy)cyclohexane, 1,2,4-tris(2,3-epoxypropanoyloxy)cyclohexane, 1,2,4,5-tetrakis(2,3-epoxybutanoyloxy)cyclohexane, 1,3-bis(2,3-epoxy-2-ethyl-hexanoyloxy)cyclopentane, 1,2,4,5-tetrakis(2,3-epoxypentanoyloxy)cycloheptane, 1,4-bis(2,3-epoxyheptanoyloxy)cycloheptane, and the like. In general, the cycloalkane nucleus of the poly(2-alkenoyloxy)cycloalkane contains from 4 to 10 carbon atoms, and preferably from 4 to 8 carbon atoms. As discussed in the preceding section concerning poly(2-alkenoyloxy)alkanes, partial epoxidation or substantialy complete epoxidation of the poly(2-alkenoyloxy)cycloalkanes can be effected depending upon the mol ratio of peracetic acid to $\alpha,\beta$-olefinic ester employed.

In another embodiment the alpha,beta-olefinic ester employed as starting material can be classified as poly(2-alkenoyloxy)benzenes such as, for example, 1,2-bis(propenoyloxy)benzene, 1,2,3-tris(2-butenoyloxy)benzene, 1,3,4-tris(2-hexenoyloxy)benzene, 1,4-bis(2-pentenoyloxy)-2-amylbenzene, 1,2,4,5-tetrakis(2-alkenoyloxy)-3,6-dihalobenzene, e.g., 1,2,4,5-tetrakis(2-butenoyloxy)-3,6-dichlorobenzene; and the like. Illustrative polyepoxide products include, among others, 1,2-bis(2,3-epoxypropanoyloxy)benzene, 1,2,3-tris(2,3-epoxybutanoyloxy)benzene, 1,3,4-tris(2,3-epoxyhexanoyloxy)benzene, 1,4-bis(2,3-epoxypentanoyloxy)-2-amylbenzene, 1,2,4,5-tetrakis(2,3-epoxyalkanoyloxy)-3,6-dihalobenzene, e.g., 1,2,4,5-tetrakis(2,3,-epoxybutanoyloxy)-3,6-dichlorobenzene; and the like. The poly(2-alkenoyloxy)benzenes can be partially or substantially completely epoxidized depending upon the mol ratios of peracetic acid to $\alpha,\beta$-olefinic ester employed, as previously explained.

The instant invention also contemplates the partial or substantially complete epoxidation of various other classes of alpha,beta-olefinic esters (that is, esters which contain no more than one 2-alkenoyloxy moieties monovalently bonded to any one carbon atom in the ester molecule) such as pentaerythritol tetra(2-alkenoates), e.g., pentaerythritol tetra(acrylate), pentaerythritol tetra(crotonate), pentaerythritol tetra($\alpha$-ethyl-$\beta$-propylacrylate), and the like; pentaerythritol monoalkanoate tris(2-alkenoates), e.g., pentaerythritol acetate tri(acrylate), pentaerythritol propionate tri($\beta$-ethylacrylate), and the like; 1,1,1-trimethylolalkane poly(2-alkenoates), e.g., 1,1,1-trimethylolpropane tri(acrylate), 1,1,1-trimethylolpropane tri(crotonate), and the like; mono- and poly(2-alkenoyloxy)-1,2-epoxycycloalkanes, e.g., 3-, 4-, 5-, and/or 6-(2-alkenoyloxy)-1,2-epoxycycloalkanes, which contain from 4 to 10 carbon atoms in the cycloalkane nucleus, 3,4-bis(2-butenoyloxy)-1,2-epoxycyclohexane, 3,5,6-tris(2-ethyl-2-hexenoyloxy)-1,2-epoxycyclohexane, 3,4-bis(2-pentenoyloxy)-1,2-epoxycyclopentane, and the like; 3,4,8,9-tetrakis(2-alkenoyloxy)tricyclo[5.2.1.0$^{2.6}$]decanes, e.g., 3,4,8,9-tetrakis(propenoyloxy)tricyclo[5.2.1.0$^{2.6}$]decane, 3,4,8,9-tetrakis(2-ethyl-2-hexenoyloxy)tricyclo[5.2.1.0$^{2.6}$]decane, and the like; a,a-bis[mono- and poly(2-alkenoyloxy)cycloalkyl]alkanes, e.g., 2,2-bis[3,4-di(propenoyloxy)cyclohexyl]propane, 2,2-bis[3,4-di(2-ethyl-2-hexenoyloxy)cyclohexyl]propane, and the like; the partial and substantially complete alpha,beta-olefinic esters of poly(2-alkenyl) alcohols; alpha,beta-olefinic esters of polyvinyl alcohol; the partial and substantially complete esterification products of alkyl glycosides, $\alpha$,D-pyranoses, etc., with acids of the acrylic acid series; mono- and poly[2-alkenoyloxy(alkyleneoxy)$_n$]-alkanes and mono- and poly[2-alkenoyloxy(alkyleneoxy)$_n$]cycloalkanes wherein $n$ is a positive integer up to about 100, wherein alkyleneoxy is ethyleneoxy, propyleneoxy, butyleneoxy, etc., and wherein the cycloalkanes nucleus contains from 4 to 10 carbon atoms; and the like. As indicated previously, partial or substantially complete epoxidation of the above-illustrated subclasses of $\alpha,\beta$-olefinic esters can be effected depending upon the mol ratio of peracetic acid to $\alpha,\beta$-olefinic ester employed.

To further illustrate the various novel glycidic esters which can be prepared by the practice of the instant invention the following are set forth: pentaerythritol tetrakis(2,3-epoxyalkanoates), e.g., pentaerythritol tetrakis(2,3-epoxypropanoate), pentaerythritol tetrakis(2,3-epoxybutanoate), pentaerythritol tetrakis(2,3-epoxy-2-ethylhexanoate), and the like; pentaerythritol monoalkanoate tris(2,3-epoxyalkanoates), e.g., pentaerythritol monoethanoate tris(2,3-epoxypropanoate), pentaerythritol monopropanoate tris(2,3-epoxypentanoate), and the like; 1,1,1-trimethylolalkane poly(2,3-epoxyalkanoates), e.g., 1,1,1-trimethylolpropane tris(2,3-epoxypropanoate), 1,1,1-trimethylolpropane tris(2,3-epoxybutanoate), and the like; mono- and poly(2,3-epoxyalkanoyloxy)-1,2-epoxycycloalkanes, e.g., 3-, 4-, 5-, or 6-(2,3-epoxypropanoyloxy) - 1,2 - epoxycyclohexane, 3,4-bis(2,3 - epoxybutanoyloxy)-1,2-epoxycyclohexane, 3,5,6-tris(2,3-epoxy-2-ethylhexanoyloxy)-1,2 - epoxycyclohexane, 3,4-bis(2,3-epoxypentanoyloxy)-1,2-epoxycyclopentane; and the like; 3,4,8,9-tetrakis(2,3-epoxyalkanoyloxy)tricyclo[5.2.1.0$^{2.6}$]-decanes, e.g., 3,4,8,9-tetrakis(2,3-epoxypropanoyloxy)-tricyclo[5.2.1.0$^{2.6}$]decane, 3,4,8,9 - tetrakis(2,3 - epoxy-2-ethylhexanoyloxy)tricyclo[5.2.1.0$^{2.6}$]decane, and the like; a,a-bis[mono- and poly(2,3-epoxyalkanoyloxy)-cycloalkyl]alkanes, e.g., 2,2-bis[3,4 - di(2,3 - epoxypropanoyloxy)cyclohexyl]propane, 2,2-bis[3,4-di(2,3-epoxy-2-ethylhexanoyloxy)cyclohexyl]propane, and the like: mono- and poly[2,3-epoxyalkanoyloxy(alkyleneoxy)$_n$]-alkanes; mono- and poly[2,3-epoxyalkanoyloxy(alkyleneoxy)$_n$]cycloalkanes; glycidic esters of poly(2-alkenyl) alcohols; glycidic esters of polyvinyl alcohol; glycidic esters of alkylglycosides, $\alpha$,D-pyranoses, etc.; and the like.

The preparation of the $\alpha,\beta$-unsaturated esters having the structural group characterized by Formula II supra is adequately disclosed in the literature. Alpha,beta-unsaturated acids can be prepared, for example, by the hydrolysis of an $\alpha,\beta$-unsaturated nitrile, which in turn can be obtained by cyanohydrination of the related carbonyl compound, followed by acetylation with acetic anhydride and pyrolysis. The $\alpha,\beta$-unsaturated acid also can be prepared by the well-known aldol condensation of aldehydes, or by the addition of a ketene to a carbonyl compound followed by thermal decomposition of the intermediate beta-lactone, or by the Perkin synthesis. The partial or essentially complete esterification of $\alpha,\beta$-unsaturated acids with mono- or polyhydroxy organic compounds is, of course, well-known chemistry. It should also be noted, however, that the instant invention contemplates the partial or substantially complete epoxidation of compounds (as reagents) which are obtained by the partial or substantially complete esterification reaction of an $\alpha,\beta$-unsaturated acid with a mono- or polyhydroxy organic compounds. The mono- and polyhydroxy organic compounds which can be reacted with $\alpha,\beta$-unsaturated acids (to produce the reagents of the novel process herein disclosed) include, for example, alkanols, cycloalkanols, cycloalkylalkanols, arylalkanols, phenols, naphthols, alkane-poly-ols, cycloalkane-poly-ols, poly(2-alkenyl) alcohols, polyvinyl alcohol, alkylglycosides, $\alpha$,D-pyranoses, alkylene glycols, mono- and polyhydroxy-substituted 1,2-epoxycycloalkanes, reaction products of olefin oxides, e.g., ethylene oxide, propylene oxide, etc., with alkanols, alkane-poly-ols, cycloalkanols, cycloalkane-poly-ols, etc.; and the like.

The epoxidation reaction can be conducted at a temperature in the range of from about 0° to about 100° C., and preferably from about 25° to about 90° C. As a practical matter, the choice of the particular temperature at which to effect the epoxidation reaction depends, to an extent, on the nature of the α,β-unsaturated carbonylic reagent. The reaction is somewhat exothermic and cooling means, such as a water jacket encompassing the reaction vessel, can be provided to prevent any possible "runaway" temperatures.

In general, the reaction time will vary depending on the concentration of the reactants, the particular α,β-olefinic ester employed, the temperature, the type and degree of agitation of the reaction mixture, and other considerations. The reaction time can be as short as minutes in length or it can be as long as 12 hours or more, e.g., from about 30 minutes to about 18 hours.

It is desirable to conduct the epoxidation reaction with equipment which will not foster the polymerization of the α,β-olefinic ester or catalyze the decomposition of peracetic acid. Equipment constructed of glass, stainless steel, aluminum and the like has been shown to be adequate for this purpose. If desired, a polymerization inhibitor or retarder such as hydroquinone, 2,4-dinitrophenol, 2,4-dinitro-m-cresol, and the like can be incorporated into the reaction mixture in an amount sufficient to prevent possible polymerization of the α,β-olefinic ester reagent. Provision can be made for heating and/or cooling the reactor contents. A suitable reflux-type condenser can be attached as an integral part of the equipment.

The particular manner of adding the reagents, i.e., the α,β-olefinic ester and peracetic acid, to the reaction vessel is not narrowly critical. One desirable procedure is to charge the α,β-olefinic ester to the reaction vessel and subsequently heat said ester to a predetermined temperature. At this temperature, and generally under constant agitation, peracetic acid, preferably in an inert organic medium such as ethyl acetate, acetone, and the like, is fed to the reaction vessel. Cooling is provided, if necessary, to compensate for the heat generated by the reaction. When the epoxidation reaction has gone to substantial completion or as far as desired, the reaction mixture can be separated into its various components, such as, by fractional distillation.

The use of an inert organic medium is not a prerequisite in the epoxidation reaction. However, it has been observed that a faster and cleaner reaction is effected by employing the peracetic acid in an inert organic medium such as ethyl acetate, acetone, and the like. A solution comprising from about 10 to 50 weight percent of peracetic acid, based on the total weight of peracetic acid and inert organic medium, is satisfactory; from about 20 to 40 weight percent of peracetic acid, based on the solution weight, is preferred. Theoretically, to effect substantially complete epoxidation of the α,β-olefinic ester, at least a stoichiometric quantity of peracetic acid per carbon to carbon double bond of the α,β-olefinic ester should be employed. Generally, an excess of peracetic acid is desirable; however, in those cases wherein an excess of α,β-olefinic ester is desirable, i.e., less than a stoichiometric quantity of peracetic acid per carbon to carbon double bond of the ester, the excess α,β-olefinic ester can be recovered by either washing out the acetic acid by-product or by careful fractionation. Such recovered material may be recycled, further increasing the efficiency of the epoxidation process.

It is apparent from a consideration of this specification that the relative ease in which glycidic ester products result from the instant epoxidation reaction between peracetic acid and an alpha,beta-olefinic ester free of aliphatic and cycloaliphatic unsaturation is indeed surprising. According to various authorities and experts in the epoxy field such as Swern, supra, the epoxidation of an alpha, beta-olefinic ester, i.e., an ester wherein a double bond is conjugated with a carbonyl group in the carboxylic acid portion of the ester molecule, with an epoxidizing agent such as perbenzoic acid is effected with extreme difficulty, if at all. The successful epoxidation process afforded by the practice of the instant invention is completely unpredictable on the basis of information available in the literature. The laborious and arduous routes pursued by several skilled chemists in the epoxy field to effect the introduction of oxirane oxygen at the site of the alpha, beta double bond which is in conjugation with a carbonyl group is testimony lending to the unpredictability or the extreme difficulty encountered by a direct epoxidation route, i.e., a single-step epoxidation process. The instant invention, it is submitted, constitutes a definite and patentable advance in the epoxy art.

The advantages of the instant process are readily apparent from the single-step nature of the operation. In addition, an economic source of epoxide oxygen is utilized, i.e., peracetic acid, rather than expensive haloacetates and difficultly handled agents such as sodium amide or other prohibitively expensive peroxygen chemicals such as perbenzoic acid or peroxytrifluoroacetic acid.

The glycidic esters of this invention are a useful class of compounds. The α,β,β-trialkyl substituted glycidic esters have shown promise as agents to prevent stem rust on oats. The glycidic esters can be hydrolyzed to glycidic acids as illustrated by the following equation:

(VII)
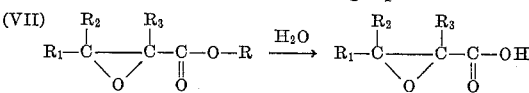

wherein R can be, for example, a hydrogen atom or an alkyl radical such as methyl, ethyl, propyl, and the like; and wherein $R_1$, $R_2$, and $R_3$, can be, for example, a hydrogen atom or an alkyl or aryl radical such as methyl, ethyl, propyl, phenyl, and the like. The utility of the glycidic acids is well recognized in the literature and by those skilled in the art. Decarboxylation of the resulting glycidic acids usually yields ketones or aldehydes depending upon whether the alpha substituent, i.e., the variable $R_3$ of Formula VII above, is a hydrogen atom or an alkyl radical. The following equation typifies this reaction:

(VIII)
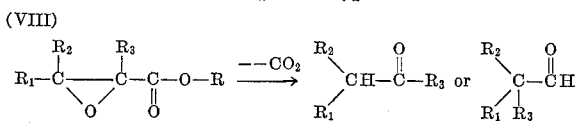

Glycidic esters can undergo rearrangement to alpha- or beta-keto acids upon heating to an elevated temperature. For example, ethyl β,β-diphenylgylcidate is isomerized to ethyl β,β-diphenyl-α-ketopropionate on distillation. Depending on the reaction conditions, glycidic esters can yield either glycidic amides, hydroxy amino esters, or hydroxy amino amides on treatment with ammonia or amines. Various β,β-dimethylglycidic ester and β-phenylglycidic esters react with sodioacetoacetic ester and sodiomalonic ester, respectively, to yield substituted γ-butyrolactones. The addition of halogen halides with glycidic ester yields α,β-halohydrin esters.

It is evident from the preceding discussion that many of the glycidic esters of this invention, e.g., mono- and poly (2,3-epoxyalkanoyloxy)alkanes, mono- and poly-(2,3-epoxyalkanoyloxy)cycloalkanes, mono- and poly(2,3-epoxyalkanoyloxy)benzenes, pentaerythritol tetrakis(2,3-epoxyalkanoates), pentaerythritol monoalkanoate tris(2, 3 - epoxyalkanoates), 1,1,1 - trimethylolalkane poly(2,3-epoxyalkanoates), mono- and poly(2,3-epoxyalkanoyloxy) - 1,2-epoxycycloalkanes, 3,4,8,9-tetrakis(2,3-epoxyalkanoyloxy)tricyclo[5.2.1.0$^{2.6}$]decanes, a,a - bis[mono- and poly(2,3-epoxyalkanoyloxy)cycloalkyl]alkanes, glycidic esters of poly(2-alkenyl) alcohols, of poly(vinyl) alcohols, of alkylglycosides, of α,D-pyranoses, etc., mono- and poly[2,3 - epoxyalkanoyloxy)alkyleneoxy)$_n$]alkanes wherein $n$ is a positive integer up to about 100, alkylene glycol bis(2,3-epoxyalkanoates), the epoxycycloalkane-1-carboxylates, and the like, are valuable intermediates in numerous chemical reactions (as illustrated previously)

to produce ketones, aldehydes, acids, esters, etc., which are valuable and useful as inert organic diluents, solvents, paint thinners, plasticizers, and the like. Moreover, novel glycidic esters such as, for example, poly(2,3-epoxyalkanoyloxy)alkanes, poly(2,3 - epoxyalkanoyloxy)cycloalkanes, pentaerythritol tetrakis(2,3-epoxyalkanoates), pentaerythritol monoalkanoate tris(2,3-epoxyalkanoates), 1,1,1-trimethylolalkane tri(2,3-epoxyalkanoates), poly(2,3-epoxyalkanoyloxy)1,2-epoxycycloalkanes 3,4,8,9-tetrakis(2,3 - epoxyalkanoyloxy) tricyclo[5.2.1.0$^{2.6}$]decanes, glycidic esters of poly(2-alkenyl) alcohols, of poly(vinyl) alcohols, etc., a,a,-bis[poly(2,3-epoxyalkanoyloxy)cycloalkyl]alkanes, poly[2,3-epoxyalkanoyloxy(alkyleneoxy)$_n$]-alkanes, and others illustrated previously, can be reacted, at elevated temperatures, with organic hardeners such as aliphatic polyfunctional amines, e.g., diethylenetriamine, triethylenetetramine, etc., in a ratio so as to provide, for example, one amino hydrogen of said polyfunctional amine per epoxy group,

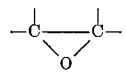

of glycidic ester to thus form useful resins having utility in the molding, adhesive, etc., arts. Other organic hardeners such as polycarboxylic acids and their anhydrides, e.g., phthalic acid, phthalic anhydride, tetrahydrophthalic anhydride, pyromellitic anhydride, maleic anhydride, and others can also be employed. The partially epoxidized glycidic esters, i.e., those esters containing at least one α,β-carboxylic acid residue,

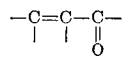

and at least one glycidic ester group,

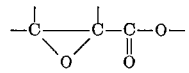

such as those illustrated previously can be homopolymerized through the epoxy group,

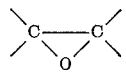

by the use of, for example, boron trifluoride as a catalyst therefor, to thus produce relative low molecular weight polymer products can be cured at elevated temperatures and/or a peroxide catalyst, e.g., benzoyl peroxide, tert. butyl hydroperoxide, etc., to give a cross-linked resin. If desired, the above-said low molecular weight polymer products can be dissolved in various inert organic solvents, e.g., low molecular weight aliphatic ketones, esters, etc., to produce solutions which have applicability in the coatings art. The resulting solutions can be applied as coatings on various surfaces and cured at elevated temperatures and/or by the use of a peroxide catalyst to give hard, cross-linked coatings.

The following examples are illustrative.

EXAMPLE 1

An amount of 19.8 grams (0.1 mole) of butyl α-ethyl-β-propylacrylate was mixed with 39.7 grams of 23.5 weight percent solution of peracetic acid in acetone (0.125 mole) in a small flask. After stirring at room temperature for 23 hours and for 5 hours at 45° C., analyses indicated that 44 percent of the olefin had reacted with peracetic acid. Then the acetone, acetic acid and peracetic acid were rapidly stripped from the reaction mixture. The residual material was analyzed for epoxide content. A figure of 12.4 percent of butyl 2-ethyl-2,3-epoxyhexanoate was ascertained.

EXAMPLE 2

Ethyl α-ethyl-β-propylacrylate (1.363 moles or 232 grams) was allowed to react at 60° C. for nine hours with peracetic acid in acetone (1.074 moles or 544 grams of a 23.8 weight percent solution) in a glass reaction flask equipped with a stirrer, reflux condenser and addition funnel. After the stated period, 87.6 percent of the theoretical amount of peracid had reacted with the olefin. The reaction mixture was fed into a still system containing refluxing ethylbenzene to facilitate removal of the acetic acid. Subsequent fractional distillation gave 200 grams ethyl 2-ethyl-2,3-epoxyhexanoate. The properties were as follows:

Boiling point _____ 86° C./5 mm. of Hg.
$n_D^{30}$ _____ 1.4279.
Specific gravity, 20/4_____ 0.9638.
Purity by HBr analysis_____ 99.1 percent.

| Elemental Analyst | Percent | |
|---|---|---|
| | Found | Theoretical |
| Carbon | 64.66 | 64.49 |
| Hydrogen | 9.62 | 9.74 |

The yield was 79 percent of the theoretical.

EXAMPLE 3

In a manner similar to that described in Example 2, 2-ethylhexyl α-methyl-β-ethylacrylate (0.54 mole or 122 grams) was allowed to react with peracetic acid in acetone (0.81 mole or 257 grams of a 24 weight percent solution). A reaction period of 6.5 hours at 60° C. provided a reasonable quantity of 84 percent pure glycidic ester on distillation. The impure ester (contaminated with unreacted olefin) was re-treated with peracetic acid (an additional ½ mole) at 60° C. for six hours. Subsequent azeotropic removal of the acetic acid and unspent peracetic acid with an ethylbenzene azeotrope followed by fractional distillation gave 97 grams of 2-ethylhexyl 2-methyl-2,3-epoxyvalerate. The properties were as follows:

Boiling point _____ 126° C./5 mm. of Hg.
$n_D^{30}$ _____ 1.4365.
Specific gravity, 20/4_____ 0.9327.
Purity by HBr analysis_____ 97.3 percent.

| Elemental Analysis | Percent | |
|---|---|---|
| | Found | Calculated |
| Carbon | 69.84 | 69.38 |
| Hydrogen | 10.58 | 10.81 |

The yield was 74.3 percent of the theoretical.

EXAMPLE 4

The procedure used in this example was identical to that employed in Example 2. A weight of 165 grams (0.833 mole) of 2-ethylhexyl crotonate was reacted with 385 grams (1.249 moles) of a 26.4 weight percent solution of peracetic acid in acetone. A total reaction period of 12 hours at an average temperature of 60° C. gave a conversion of 80.3 percent of the theoretical amount of peracetic acid. Azeotropic removal of the acetic acid and unspent peracetic acid followed by careful fractionation gave 36 grams of 2-ethylhexyl 2,3-epoxybutyrate. The properties are as follows:

Boiling point _____ 116° C./5 mm. of Hg.
$n_D^{30}$ _____ 1.4358.

The yield was 20.2 percent of the theoretical.

EXAMPLE 5

In a manner identical to that outlined in Example 2, methyl α-ethyl-β-propylacrylate (368 grams or 2.36 moles) was allowed to react with peracetic acid in acetone (1.120 grams of a 24 weight percent solution or 3.54 moles). A reaction period of 11 hours at an average temperature of 50° C. provided a peracid conversion of 96.7 percent of the theoretical amount. Azeotropic removal of the lower boiling components followed by fractional distillation gave 295 grams of methyl 2-ethyl-2,3-epoxyhexanoate. The properties were as follows:

Boiling point _____ 80° C./5 mm. of Hg.
$n_D^{30}$ _____ 1.4289.
Specific gravity, 20/4 _____ 0.9857.
Purity by HBr analysis _____ 100 percent.

| Elemental Analysis | Percent | |
|---|---|---|
| | Found | Calculated |
| Carbon | 62.88 | 62.76 |
| Hydrogen | 9.19 | 9.36 |

The yield was 72.6 percent of the theoretical.

EXAMPLE 6

In the manner outlined in Example 2, 198 grams (1 mole) of ethylene glycol dicrotonate were allowed to react with 341 grams (1.1 moles) of a 24.5 weight percent solution of peracetic acid in ethyl acetate over a period of approximately 13 hours at 75° C. after which period of time 96.5 percent of the theoretical amount of peracid had been converted. After azeotropic removal of acetic acid and unspent peracetic acid, careful fractional distillation gave 100 grams of ethylene glycol crotonate 2,3-epoxybutyrate. The properties were as follows:

Boiling point _____ 133°–137° C./2 mm. of Hg.
$n_D^{30}$ _____ 1.4595.
Specific gravity, 20/4 _____ 1.1342.
Purity as epoxide (HBr analysis) _____ 97.2 percent.
Purity as epoxide (saponification) _____ 96.5 percent.

| Elemental Analysis | Percent | |
|---|---|---|
| | Found | Calculated |
| Carbon | 55.75 | 56.07 |
| Hydrogen | 6.48 | 6.59 |

The yield was 47.0 percent of theoretical.

EXAMPLE 7

In the procedure outlined in Example 2, a weight of 198 grams (1 mole) of ethylene glycol dicrotonate and 776 grams (2.5 moles) of peracetic acid in ethyl acetate (24.5 weight percent solution) were allowed to react at 75° C. After approximately 15 hours, analyses showed that 96.7 percent of the theoretical amount of peracid had been consumed. The by-product acetic acid, unspent peracetic acid and solvent then were rapidly removed by azeotropic distillation with ethylbenzene. Subsequent flash distillation of the residue remaining, followed by careful fractionation gave 53 grams of ethylene glycol bis(2,3-epoxybutyrate). The properties were as follows:

Boiling range _____ 160°–165° C./3 mm. of Hg.
$n_D^{30}$ _____ 1.4550.
Purity by HBr analysis ___ 85.5 percent.

The yield was 23.1 percent of the theoretical.

EXAMPLE 8

A solution of peracetic acid (328 grams, 4.3 moles) in ethyl acetate was fed to methyl sorbate (204 grams, 1.44 moles) with vigorous stirring at 85° C. during 2.5 hours. The exothermic nature of the reaction was such that, to maintain this temperature, slight cooling was required during the first hour and slight heating during the last hour of reaction. After the addition was complete the reaction mixture was boiled for an additional two hours and cooled, at which time titration for peracetic acid indicated that more than the theoretical amount was consumed. Acetic acid and ethyl acetate were separated from the reaction mixture by azeotropic distillation with refluxing ethylbenzene. Fractionation of the residue gave 108 grams of methyl 2,3-4,5-diepoxyhexanoate. The properties were as follows:

Boiling range _____ 50°–98° C./0.35–0.80 mm. of Hg.
$n_D^{30}$ _____ 1.4543–1.4548.

A fraction having a boiling range of 75°–98° C./0.4 mm. of Hg possessed the following properties:

$n_D^{30}$ _____ 1.4543

Saponification equivalent: Found, 158. Theoretical, 158.

The yield was 43 percent of the theoretical.

EXAMPLE 9

In a manner identical to that employed in Example 8, ethyl sorbate was treated with an excess of peracetic acid in a 3.0/1.0 molar ratio of peracid to olefin at 80°–85° C. After a five hour reaction period, crude ethyl 2,3-4,5-diepoxyhexanoate was obtained by distillation. The properties were as follows:

Boiling range _____ 52°–70° C./0.2–0.7 mm. of Hg.
$n_D^{30}$ _____ 1.4528–1.4460.

The yield was 41 percent of the theoretical.

EXAMPLE 10

A weight of 600 grams (6.0 moles) of methyl crotonate was reacted over a six-hour period at 75° C. with 3.0 moles (1030 grams of a 22.2 weight percent solution) of peracetic acid in ethyl acetate. Direct distillation served to remove acetic acid, ethyl acetate, and unspent peracid (conversion=86.7 percent). Careful fractionation allowed recovery of the excess methyl crotonate and gave 166 grams of pure methyl 2,3-epoxybutyrate. The properties were as follows:

Boiling point _____ 86°–86.5° C./50 mm. of Hg.
$n_D^{30}$ _____ 1.4149.
Specific gravity, 20/4 ___ 1.0729.
Purity by saponification analysis _____ 97.5 percent.

| Elemental Analysis | Percent | |
|---|---|---|
| | Found | Calculated |
| Carbon | 51.54 | 52.27 |
| Hydrogen | 6.92 | 7.15 |

The yield was 55.5 percent of the theoretical.

EXAMPLE 11

In a manner identical to that employed in Example 10, 2,736 grams (24.0 moles) of ethyl crotonate were allowed to react with 4,130 grams (12.0 moles) of a 22.2 weight percent solution of peracetic acid in ethyl acetate. After a reaction period of 5.5 hours at 83°–85° C., a conversion of 92.7 percent of the peracid had taken place. Direct fractionation after a rapid removal of the lower boiling components of the mixture gave 1,167 grams of ethyl 2,3-epoxybutyrate. The properties were as follows:

Boiling point _____ 94°–95° C./50 mm. of Hg.
$n_D^{30}$ _____ 1.4150.
Specific gravity, 20/4 _____ 1.0345.
Purity by saponification analysis _____ 98.2 percent.

| Elemental Analysis | Percent | |
| --- | --- | --- |
| | Found | Calculated |
| Carbon | 55.60 | 55.37 |
| Hydrogen | 7.67 | 7.75 |

The yield was 74.8 percent of the theoretical.

A weight of 252 grams of residual material remained after distillation. Analyses indicated that it was a polymer derived from the crotonate ester, and that it was not a product of the decomposition of the glycidic ester.

EXAMPLE 12

According to the procedure outlined in Example 10, 1,080 grams (7.6 moles) of ethyl β-methyl-β-ethylacrylate were treated with 1,390 grams (3.5 moles of a 20.8 weight percent solution) of peracetic acid in ethyl acetate. After 2 hours at 38° C., 93.2 percent of the available peracid had reacted. Distillation gave 517 grams of ethyl 3-methyl-2,3-epoxyvalerate. The properties were as follows:

Boiling point _____ 90°–91° C./25 mm. of Hg.
$n_D^{30}$ _____ 1.4181.
Specific gravity, 20/4 _____ 0.9911.
Purity by saponification analysis _____ 99.7 percent.

| Elemental Analysis | Percent | |
| --- | --- | --- |
| | Found | Calculated |
| Carbon | 60.98 | 60.74 |
| Hydrogen | 8.68 | 8.92 |

The yield was 92.0 percent of the theoretical.

EXAMPLE 13

In the manner outlined in Example 10, 733 grams (5.72 moles) of ethyl β,β-dimethylacrylate were treated with 1045 grams (2.86 moles of a 20.8 weight percent solution) of peracetic acid in ethyl acetate. After 3.75 hours at 83° C., analyses indicated 96.8 percent of the available peracid had been consumed. Distillation gave 346 grams of ethyl 3-methyl-2,3-epoxybutyrate. The properties were as follows:

Boiling point _____ 100° C./50 mm. of Hg.
$n_D^{30}$ _____ 1.4172.
Specific gravity, 20/4 _____ 1.0059.
Purity by saponification analysis _____ 99.7 percent.

| Elemental Analysis | Percent | |
| --- | --- | --- |
| | Found | Calculated |
| Carbon | 58.58 | 58.31 |
| Hydrogen | 8.26 | 8.39 |

The yield was 84.2 percent of the theoretical.

EXAMPLE 14

A weight of 352 grams (2.0 moles) of ethyl cinnamate was charged to a glass reactor. Then at 80° C., peracetic acid (914 grams of a 20.8 weight percent solution or 2.5 moles) in ethyl acetate was fed into the equipment over a one-hour period. After a total reaction period of 7 hours, analyses indicated a total conversion of 103 percent of the theoretical amount had been obtained. The mixture was then stored overnight at ice temperature. The next morning, the reaction mixture was rapidly freed of solvent, acetic acid and unspent peracetic acid by flash distillation at 50 mm. of Hg pressure. After further reduction of system pressure, fractionation gave 268 grams of ethyl 3-phenyl-2,3-epoxypropionate. The properties were as follows:

Boiling point _____ 104° C./0.3 mm. of Hg.
$n_D^{30}$ _____ 1.5095.
Specific gravity, 20/4 _____ 1.1023.

Saponification equivalent: Found, 193.5. Theoretical, 192.

| Elemental Analysis | Percent | |
| --- | --- | --- |
| | Found | Calculated |
| Carbon | 68.77 | 68.73 |
| Hydrogen | 6.55 | 6.30 |

The yield was 69.7 percent of the theoretical.

EXAMPLE 15

A total of 300 grams (3.0 moles) of ethyl acrylate stabilized with 0.2 weight percent of hydroquinone, based on the weight of the ester, was placed in an amber glass reaction flask. At 75° C., peracetic acid was added over a 45-minute period until 365 grams (0.97 mole of a 21.0 weight percent solution in ethyl acetate) had been added. After 5 more hours of continuous agitation and heating, analyses showed that only 40 percent of the available peracid had been consumed. Rapid flash distillation resulted in removing the volatile components of the reaction mixture from the residual acrylate polymer (240 grams). Careful re-distillation gave 10 grams of ethyl 2,3-epoxypropionate. The properties were as follows:

Boiling point _____ 72°–73° C./26 mm. of Hg.
$n_D^{30}$ _____ 1.4150.
Specific gravity, 20/4 _____ 1.085.
Purity by saponfication analysis _____ 99.0 percent.

| Elemental Analysis | Percent | |
| --- | --- | --- |
| | Found | Calculated |
| Carbon | 51.70 | 51.54 |
| Hydrogen | 6.77 | 6.92 |

The yield was 21.5 percent based on the amount of peracid actually consumed.

EXAMPLE 16

A weight of 900 grams (9.0 moles) of methyl methacrylate stabilized with 0.5 weight percent hydroquinone, based on the weight of the ester, was treated with 1,836 grams of peracetic acid solution (5.05 moles of a 21 weight percent solution in ethyl acetate) over a 5.5 hour period at 75°–85° C. After that, analysis showed that 69.5 percent of the theoretical amount of peracid had been consumed. Then, the reaction mixture was rapidly distilled away from polymerized methyl methacrylate. Careful reduced pressure fractionation gave 278 grams of pure methyl 2-methyl-2,3-epoxypropionate. The properties were as follows:

Boiling point _____ 66° C./30 mm. of Hg.
$n_D^{30}$ _____ 1.4134.
Specific gravity, 20/4 _____ 1.0972.
Purity by saponification
  analysis _____ 100.2 percent.

| Elemental Analysis | Percent | |
|---|---|---|
| | Found | Calculated |
| Carbon | 51.86 | 51.54 |
| Hydrogen | 6.78 | 6.92 |

The yield was 47.5 percent of the theoretical, or 68.4 percent based on the peracid actually consumed.

EXAMPLE 17

In the manner outlined in Example 14, 344 grams (2.21 moles) of ethyl β,β-diethylacrylate were heated with 2.8 moles (1,012 grams of a 21.6 weight percent solution in ethyl acetate) of peracetic acid at 35° C. over a 4-hour period. After this period of time, 90 percent of the available peracid had been consumed. Rapid flash distillation of the lower boiling components of the reaction mixture, followed by careful low pressure fractionation gave 280 grams of ethyl 3-ethyl-2,3-epoxyvalerate. The properties were as follows:

Boiling point _____ 104° C./25 mm. of Hg.
$n_D^{30}$ _____ 1.4248.
Specific gravity, 20/4 _____ 0.9774.
Purity by saponification
  analysis of ester linkage _____ 95.4 percent.

The yield was 73.7 percent of the theoretical.

EXAMPLE 18

In a manner referred to in Example 15, 367 grams (2.01 moles) of butyl 1-cyclohexenecarboxylate were heated with 2.5 moles (902 grams of a 21 weight percent solution) of peracetic acid in ethyl acetate at 65° C. for 5.5 hours. At the end of this period, 93.2 percent of the available peracid had reacted. Careful fractionation after rapid removal of the more volatile solvent and acetic acid gave 336 grams of butyl 7-oxabicyclo[4.1.0]heptane-1-carboxylate. The properties were as follows:

Boiling point _____ 94° C./1.2 mm. of Hg.
$n_D^{30}$ _____ 1.4553.
Specific gravity, 20/4 _____ 1.0353.
Purity by HBr analysis _____ 99.8 percent.

| Elemental Analysis | Percent | |
|---|---|---|
| | Found | Calculated |
| Carbon | 67.04 | 66.64 |
| Hydrogen | 9.02 | 9.15 |

The yield was 87.0 percent of the theoretical.

EXAMPLE 19

In a manner referred to in Example 14, 457 grams (357 moles) of ethyl β-ethylacrylate were treated with 4.07 moles (1,474 grams of a 21 weight percent solution) of peracetic acid in ethyl acetate. After 5.5 hours at 65° C., a peracid conversion of 69 percent was observed. After flash distillation of the ethyl acetate and acetic acid fractions, careful reduced pressure distillation gave 295 grams of ethyl 2,3-epoxyvalerate. The properties were as follows:

Boiling point _____ 80° C./15 mm. of Hg.
$n_D^{30}$ _____ 1.4176.
Specific gravity, 20/4 _____ 1.0157.
Purity by saponification
  analysis of ester linkage _____ 100.5 percent.

| Elemental Analysis | Percent | |
|---|---|---|
| | Found | Calculated |
| Carbon | 58.53 | 58.31 |
| Hydrogen | 8.20 | 8.39 |

The yield was 57.4 percent of the theoretical.

EXAMPLE 20

In a fashion similar to the method employed in Example 14, 285 grams (1.5 moles) of ethyl α-methylcinnamate were reacted with 2.25 moles (815 grams of a 21 weight percent solution) of peracetic acid in ethyl acetate. After a reaction period of 6 hours at 80° C., analyses showed 97 percent of the available peracid had been consumed. Rapid flash distillation of the solvent and acetic acid, followed by careful reduced pressure fractionation gave 269 grams of ethyl 2-methyl-3-phenyl-2,3-epoxypropionate. The properties were as follows:

Boiling point _____ 121° C./4 mm. of Hg.
$n_D^{30}$ _____ 1.5052.
Specific gravity, 20/4 _____ 1.0865.
Purity by saponification
  analysis _____ 99.4 percent.

| Elemental Analysis | Percent | |
|---|---|---|
| | Found | Calculated |
| Carbon | 70.19 | 69.88 |
| Hydrogen | 6.70 | 6.84 |

The yield was 87.1 percent of the theoretical.

EXAMPLE 21

In the manner outlined in Example 2, a weight of 27 grams (0.142 mole) of ethyl α-phenylcrotonate was allowed to react with 163 grams of (0.592 mole) of a 27.5 weight percent solution of peracetic acid in ethyl acetate. After 5 hours at 50° C., analyses indicated that the theoretical amount of peracid had been consumed. The reaction mixture was placed in a small still system and rapidly distilled to remove the solvent and excess unreacted peracid. A weight of 28 grams of ethyl 2-phenyl-2,3-epoxybutyrate was obtained. The properties were as follows:

Boiling point _____ 110°–111° C./3 mm. of Hg.
$n_D^{30}$ _____ 1.4993.
Purity by saponification
  analysis _____ 99.8 percent.

| Elemental Analysis | Percent | |
|---|---|---|
| | Found | Calculated |
| Carbon | 69.68 | 69.88 |
| Hydrogen | 6.66 | 6.89 |

The yield was 95 percent of the theoretical.

EXAMPLE 22

A mixture of 156 grams of 1,5-pentanediol, 468 grams of α-ethyl-β-propylacrylic acid, 300 milliliters of toluene, and 3 grams of methanesulfonic acid was placed in a conventional still system and refluxed at atmospheric pressure for 7 hours at a temperature of 135 to 165° C., after which time the water formed in the reaction ceased to distill from the mixture. The resulting solution was neutralized with dilute sodium hydroxide solution, washed with water and distilled under reduced pressure to provide 1,5-pentanediol bis(α-ethyl-β-propylacrylate) having no residual acidity. This liquid product possessed the following properties:

Boiling point _____ 165°–169° C./75 mm. of Hg.
$n_D^{30}$ _____ 1.4672.
Specific gravity, 20/20____ 0.9565.
Purity by saponification
  analysis _____ 99.0 percent.

A weight of 100 grams (0.284 mol) of the above ester was charged to a 500 milliliter 4-necked reaction flask equipped with a stirrer, condenser, thermometer, and dropping funnel. After the ester was heated to 75° C., peracetic acid (230 grams or 0.880 mol of a 29.1 percent solution in ethyl acetate) was added with continuous stirring over a 15-minute period. The temperature of the reaction mixture was maintained for an additional 3 hours after which time an analysis for peracetic acid indicated that the reaction was complete. Then the reaction mixture was fed dropwise to refluxing ethyl-benzene to facilitate the removal of ethyl acetate, acetic acid and unspent peracetic acid. Continued distillation under greater vacuum gave 84 grams of 1,5-pentanediol bis(2-ethyl-2,3-epoxyhexanoate) having the following properties:

Boiling point _____ 216° C./2.0 mm. of Hg.
$n_D^{30}$ _____ 1.4542.
Specific gravity, 26/4_____ 1.0166.
Purity by HBr analysis_____ 97.4 percent.

The yield was 77 percent of the theoretical.

EXAMPLE 23

A mixture of 268 grams of 1,1,1-trimethylolpropane (2 mols), 936 grams of α-ethyl-β-propylacrylic acid (6 mols), 300 grams of toluene, and 3.6 grams of p-toluenesulfonic acid was heated under reflux on a still having a decanter for the removal of water. After 67 hours, during which time the kettle temperature rose from about 150° C. to 175° C., a total of 100 grams of water layer had been removed by the decanter. The kettle material was neutralized with sodium acetate then washed 4 times with water to remove salts and unreacted 1,1,1-trimethylolpropane. The ester was dried and unreacted α-ethyl-β-propylacrylic acid was removed by stripping on a short column to a temperature of 240° C. at a pressure of 4 mm. of Hg. The product was then flash distilled on a one-plate column yielding 791 grams of material boiling at 194° C. to 240° C. at a pressure of 3 mm. of Hg. An analysis for ester by saponification indicated a purity of 98.5 percent of 1,1,1-trimethylolpropane tris(α-ethyl-β-propylacrylate).

| Elemental Analysis ($C_{30}H_{50}O_6$) | Percent | |
|---|---|---|
| | Found | Calculated |
| Carbon | 70.09 | 70.12 |
| Hydrogen | 9.84 | 9.94 |

EXAMPLE 24

*Preparation of Trimethylolpropane Tris(2,3-Epoxy-2-Ethyl Hexanoate)*

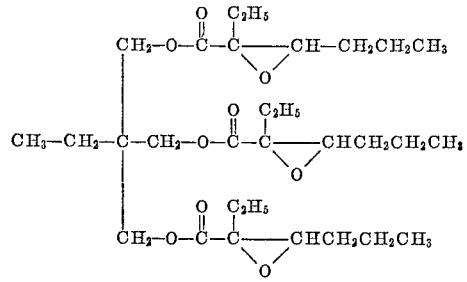

A solution (654 grams) of peracetic acid (25.6 weight percent) in ethyl acetate was added dropwise with stirring to 250 grams of 1,1,1-trimethylolpropane tris(α-ethyl-β-propylacrylate) over a one-hour period at 50° C. After 2 hours the temperature was raised to about 65–70° C. and held for an additional 5 hours. An analysis for peracetic acid indicated that the reaction had gone to completion. The volatiles were removed by stripping under reduced pressure in a one-plate column. The residue product was diluted with an equal volume of benzene and washed with 10 weight percent sodium hydroxide solution and with water to remove the last traces of acetic acid. The residue product, a colorless slightly viscous liquid, was dried by heating under vacuum. Analysis of the product for epoxide content by the hydrogen bromide method indicated a purity of 92 percent. The acidity was nil and the infrared spectrum was compatible with the structure assigned.

| Elemental Analysis ($C_{30}H_{50}O_9$) | Percent | |
|---|---|---|
| | Found | Calculated |
| Carbon | 64.49 | 64.91 |
| Hydrogen | 9.09 | 9.09 |

EXAMPLE 25

A mixture of 205 grams of pentaerythritol (1.5 mols), 1,248 grams of α-ethyl-β-hexenoic acid (8 mols), 350 grams of toluene, and 6 grams of p-toluenesulfonic acid was heated under reflux on a still having a decanter for the removal of water. After 60 hours, during which time the kettle rose from about 160° C. to 175° C., a total of 105 grams of water layer had been removed by the decanter. The kettle material was neutralized with sodium acetate then washed four times with water to remove salts and unreacted pentaerythritol. The ester was dried, and toluene and unreacted α-ethyl-β-propylacrylic acid were removed by stripping on a 6-inch packed column, to a kettle temperature of about 230° C. at a pressure of 1.5 mm. of Hg. The residue product, 592 grams of pentaerythritol tetra(α-ethyl-β-propylacrylate), was a light amber viscous liquid having the following properties:

$n_D^{30}$ _____ 1.4810.
Purity by saponification analysis_____ 99.3 percent.

EXAMPLE 26

*Preparation of Pentaerythritol Tetrakis(2,3-Epoxy-2-Ethyl Hexanoate)*

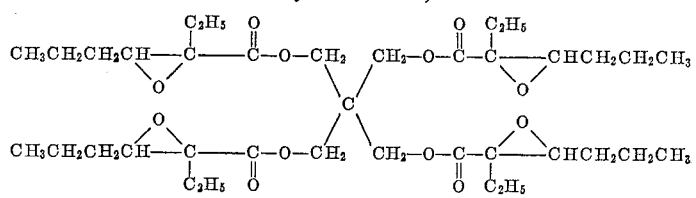

A solution (880 grams) of peracetic acid (25.6 weight percent) in ethyl acetate was added with stirring to 316 grams of pentaerythritol tetra (α-ethyl-β-propylacrylate) over a period of one hour at a temperature of 65° C. After an additional four-hour reaction period, an analysis for peracetic acid indicated that the reaction was complete. The volatiles were removed by co-distillation with ethylbenzene. The resulting residue product was a pale yellow, slightly viscous liquid having the following properties:

$n_D^{30}$------------------------------------- 1.4698.
Purity by HBr analysis------------------ 85.6 percent.

The infrared spectrum was consistent with the assigned structure.

It is obvious that various modifications of this invention can be made by those skilled in the art without departing from the spirit and scope thereof.

What is claimed is:

1. Alkanediol bis(2,3-epoxyalkanote) wherein the alkane moiety contains from 2 to 10 carbon atoms and wherein the epoxyalkanote moiety contains up to 8 carbon atoms.

2. Ethylene glycol bis(2,3-epoxybutyrate).

3. 1,5-pentanediol bis(2-ethyl-2,3-epoxyhexanoate).

References Cited in the file of this patent

UNITED STATES PATENTS

| | | |
|---|---|---|
| 1,873,430 | Knorr et al. | Aug. 23, 1932 |
| 1,899,340 | Knorr et al. | Feb. 28, 1933 |
| 2,432,118 | Muller et al. | Dec. 9, 1947 |
| 2,680,109 | Stevens et al. | June 1, 1954 |
| 2,772,295 | Burness | Nov. 27, 1956 |
| 2,779,771 | Phillips et al. | Jan. 29, 1957 |
| 2,786,068 | Frostick et al. | Mar. 19, 1957 |
| 2,786,837 | Farrar et al. | Mar. 26, 1957 |
| 2,810,733 | Greenspan | Oct. 22, 1957 |
| 2,836,605 | Rowland et al. | May 27, 1958 |
| 2,886,472 | Condo et al. | May 12, 1959 |
| 2,889,338 | Dazzi | June 2, 1959 |
| 2,927,931 | Phillips et al. | Mar. 8, 1960 |

OTHER REFERENCES

Newman: Organic Reaction, volume V, pages 413–440.
Elsevier's Encyclopedia of Organic Chemistry, volume 12A, page 958.
Beilstein et al.: Volume 18, pages 305–306 (1934).
Swern: J.A.C.S., volume 69, pages 1692–1698 (1947).